(12) United States Patent
Chen et al.

(10) Patent No.: US 12,691,806 B2
(45) Date of Patent: Jul. 28, 2026

(54) AUTOMATIC GUIDED VEHICLE

(71) Applicant: BEIJING JINGDONG QIANSHI TECHNOLOGY CO., LTD., Beijing (CN)

(72) Inventors: Ying Chen, Beijing (CN); Lei Zhang, Beijing (CN); Xu Liu, Beijing (CN); Guoku Song, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 402 days.

(21) Appl. No.: 18/257,508

(22) PCT Filed: Apr. 1, 2022

(86) PCT No.: PCT/CN2022/084745
    § 371 (c)(1),
    (2) Date: Jun. 14, 2023

(87) PCT Pub. No.: WO2022/218167
    PCT Pub. Date: Oct. 20, 2022

(65) Prior Publication Data
    US 2024/0034216 A1      Feb. 1, 2024

(30) Foreign Application Priority Data
    Apr. 12, 2021    (CN) .......................... 202110388144.9

(51) Int. Cl.
    *B60P 1/02*        (2006.01)
    *B66F 9/06*        (2006.01)
    *B66F 9/24*        (2006.01)
(52) U.S. Cl.
    CPC ................ *B60P 1/02* (2013.01); *B66F 9/063* (2013.01); *B66F 9/24* (2013.01)

(58) Field of Classification Search
    CPC ............... B66F 9/063; B66F 9/24; B60P 1/02
    See application file for complete search history.

(56) References Cited

U.S. PATENT DOCUMENTS 7,073,634 B2 * 7/2006 Mitchell .............. B65G 1/0492
                                                        187/414
11,845,372 B2 * 12/2023 Odawara ................... B60P 1/02
                        (Continued)

FOREIGN PATENT DOCUMENTS

| CN | 203921937 U | * | 11/2014 |
| CN | 205397170 U | * | 7/2016 |

(Continued)

OTHER PUBLICATIONS

CN-203921937-U (Year: 2014).*

(Continued)

*Primary Examiner* — Jason L Vaughan
(74) *Attorney, Agent, or Firm* — Myers Bigel, P.A.

(57)                    ABSTRACT

The present application relates to the technical field of transfer equipment, in particular to an AGV. The AGV includes: a chassis; a traveling mechanism arranged on the chassis to implement traveling of the AGV; and a supporting assembly including a tray, a rotating assembly and a lifting mechanism, the tray being connected to the lifting mechanism through the rotating assembly, the lifting mechanism being arranged on the chassis and including a lifting drive mechanism and a lifting mechanism, the lifting drive mechanism being in drive connection with the rotating assembly through the lifting mechanism to drive the rotating assembly and the tray to ascend or descend, and the rotating assembly driving the tray to rotate relative to the chassis. Based on this, the performance of AGVs can be improved.

14 Claims, 9 Drawing Sheets

(56) References Cited

U.S. PATENT DOCUMENTS

| | | | | |
|---|---|---|---|---|
| 2002/0074172 A1* | 6/2002 | Sugiyama | | B62B 5/0026 |
| | | | | 180/22 |
| 2005/0232729 A1* | 10/2005 | Dehne | | B62D 65/18 |
| | | | | 414/217.1 |
| 2008/0166217 A1* | 7/2008 | Fontana | | B66F 9/063 |
| | | | | 414/800 |
| 2018/0099810 A1* | 4/2018 | Wu | | B25J 5/007 |
| 2018/0099811 A1* | 4/2018 | Shen | | B66F 3/08 |
| 2020/0198946 A1 | 6/2020 | Chow et al. | | |
| 2022/0380187 A1* | 12/2022 | Nagel | | B66F 9/0755 |

FOREIGN PATENT DOCUMENTS

| | | | |
|---|---|---|---|
| CN | 106005929 A | 10/2016 | |
| CN | 106628905 A | 5/2017 | |
| CN | 108100556 A | 6/2018 | |
| CN | 108657314 A | 10/2018 | |
| CN | 109353767 A | 2/2019 | |
| CN | 110182521 A | 8/2019 | |
| CN | 111115137 A | 5/2020 | |
| CN | 212766541 U | 3/2021 | |
| CN | 113023620 A | 6/2021 | |
| EP | 3815956 A1 * | 5/2021 | ........... B66F 9/0755 |
| EP | 3960691 A1 * | 3/2022 | ........... B25J 13/089 |
| EP | 3848324 B1 * | 7/2024 | ......... B66F 9/07586 |
| JP | 2016023027 A | 2/2016 | |
| KR | 100777114 B1 | 11/2007 | |

OTHER PUBLICATIONS

CN-205397170-U (Year: 2016).*
EP-3815956-A1 (Year: 2019).*
EP-3848324-B1 (Year: 2020).*
"First Office Action and English language translation", CN Application No. 202110388144.9, Jan. 4, 2022, 13 pp.
"International Search Report and English language translation", International Application No. PCT/CN2022/084745, Jun. 2, 2022, 8 pp.
Notice of Reasons for Refusal with English translation, JP Application No. 2023-543012, Apr. 21, 2026, 8 pp.

\* cited by examiner

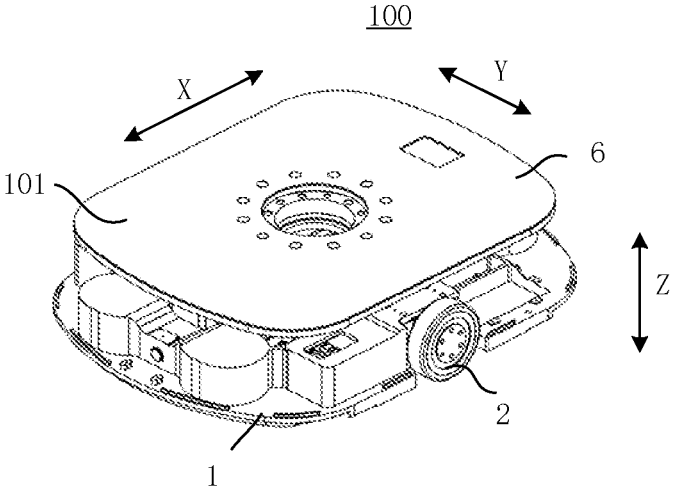
Fig. 1
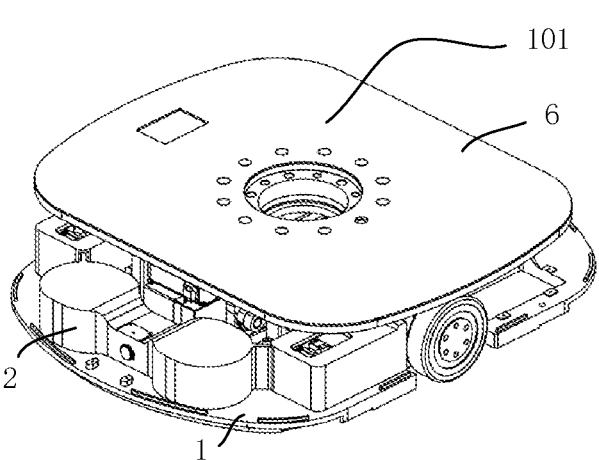
Fig. 2
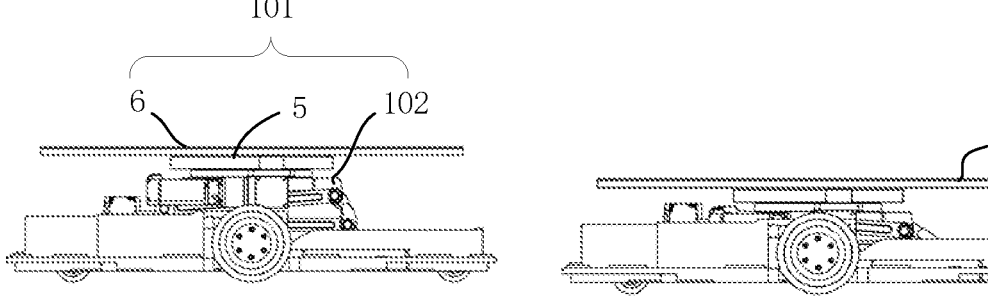
Fig. 3                                                    Fig. 4

102

3  4  5

1

2

1

11      12

22

231

23

211  L  21

5

52

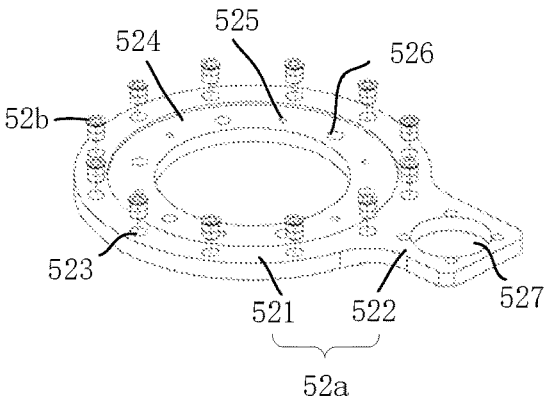
Fig. 14
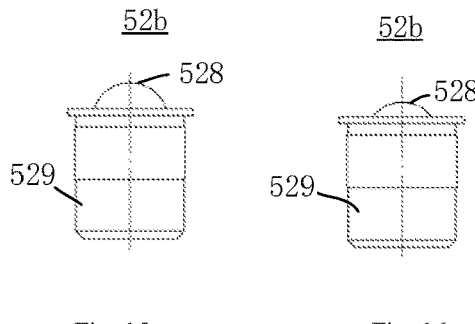
Fig. 15                    Fig. 16
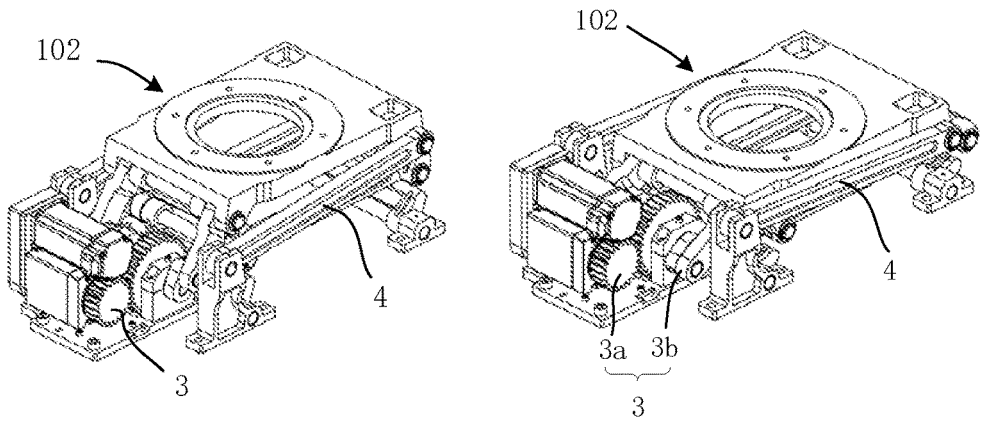
Fig. 17                                        Fig. 18

Fig. 20                                Fig. 21

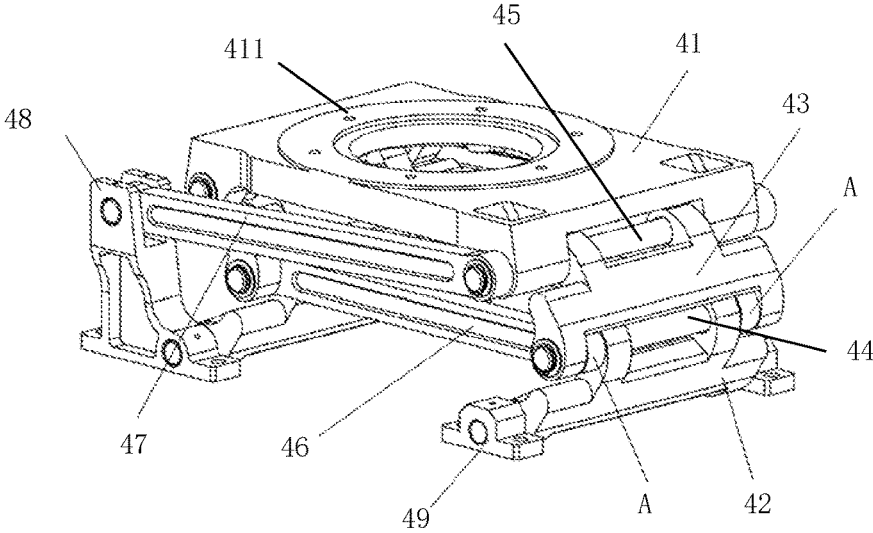
Fig. 25
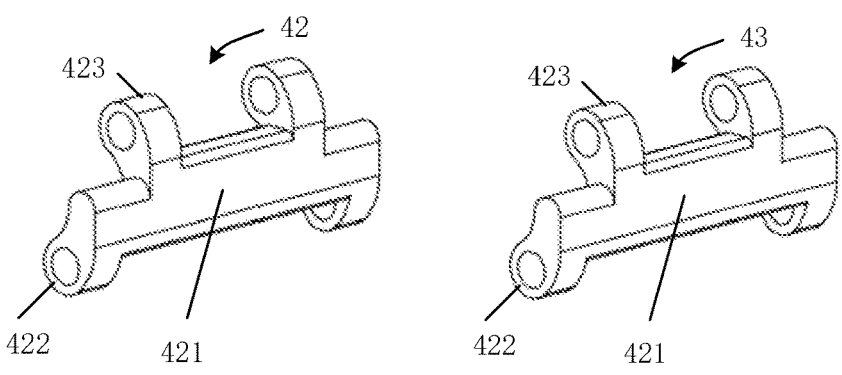
Fig. 26                                    Fig. 27
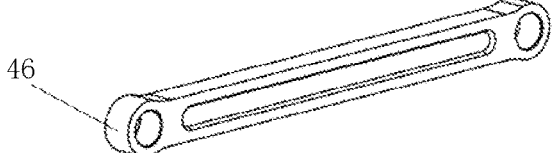
Fig. 28
Fig. 29

AUTOMATIC GUIDED VEHICLE

CROSS-REFERENCE TO RELATED APPLICATIONS

The present application is a U.S. National Stage Application under 35 U.S.C. § 371 of International Patent Application PCT/CN2022/084745, filed on Apr. 1, 2022, which itself claims priority to Chinese Patent Application No. 202110388144.9, filed on Apr. 12, 2021, the entire contents of both of which are hereby incorporated by reference in their entireties.

FIELD OF THE INVENTION

The present application relates to the technical field of transfer equipment, in particular to an automatic guided vehicle.

BACKGROUND OF THE INVENTION

An AGV, also known as an automatic guided vehicle (AGV), is widely used in the field of logistics and warehousing to achieve automatic transfer of goods. At present, the performance of AGVs still needs to be improved.

SUMMARY OF THE INVENTION

A technical problem to be solved in the present application is to improve the performance of AGVs.

To solve the above-mentioned technical problem, the present application provides a an AGV including:

a chassis;

a traveling mechanism, arranged on the chassis to implement traveling of the automatic guided vehicle; and a supporting assembly, including a tray, a rotating assembly and a lifting mechanism, the tray is connected to the lifting mechanism through the rotating assembly, the lifting mechanism is arranged on the chassis and includes a lifting drive mechanism and a lifting mechanism, the lifting drive mechanism is in drive connection with the rotating assembly through the lifting mechanism to drive the rotating assembly and the tray to ascend or descend, and the rotating assembly drives the tray to rotate relative to the chassis.

In some embodiments, the rotating assembly includes:

a slewing bearing, including an inner ring and an outer ring, the outer ring being rotatably sleeved outside the inner ring; and a damping assembly, including a connecting plate and an elastic ball, the connecting plate being arranged on an axial side of the outer ring and connected to the inner ring, and the elastic ball being arranged on the connecting plate and being squeezed by the outer ring.

In some embodiments, the damping assembly includes at least two elastic balls, and the at least two elastic balls are arranged spaced apart in a circumferential direction of the outer ring.

In some embodiments, the connecting plate is provided with an accommodating hole, and the elastic ball is arranged in the accommodating hole.

In some embodiments, the lifting drive mechanism includes:

a first power assembly, including a lifting motor, a speed reducer and a first gear successively in drive connection; and a second power assembly, including a second gear, a transmission shaft, a crank assembly and a base, the second gear being engaged with the first gear, the transmission shaft passing through the second gear and being supported by the base, the crank assembly including a crank, a rocker and a shaft sleeve, the shaft sleeve and the crank being successively sleeved on the transmission shaft in a direction away from the second gear, and the rocker and the crank being hinged with the lifting mechanism.

In some embodiments, the rocker is hinged to a side of the crank away from the second gear.

In some embodiments, the lifting drive mechanism includes two crank assemblies, and the two crank assemblies are arranged on two axial sides of the second gear and hinged with different positions of the lifting mechanism.

In some embodiments, the lifting mechanism includes:

a seat arranged on the chassis;

a first rod assembly, including two first connecting rods and two tie rods, the two first connecting rods being arranged spaced apart in a front-rear direction, lower ends of the two first connecting rods being hinged with the seat, and the two tie rods being arranged spaced apart in a left-right direction, front and rear ends of each of the tie rods being respectively hinged with upper ends of the two first connecting rods to first hinge shafts; and a second rod assembly, arranged above the first rod assembly and including a platform, two second connecting rods and two limiting rods, the two second connecting rods being arranged spaced apart in the front-rear direction, lower ends of the two second connecting rods being respectively hinged to two first hinge shafts, front and rear ends of the platform being respectively hinged with upper ends of the two second connecting rods to second hinge shafts, the two limiting rods being arranged spaced apart along the left-right direction, front ends of the limiting rods being hinged with the seat, and rear ends of the limiting rods being hinged with the second hinge shaft;

wherein in the left-right direction, hinge points of the tie rods and the first hinge shafts are arranged staggered with hinge points of the limiting rods and the second hinge shaft, and the tie rods and the limiting rods are straight rods.

In some embodiments, in the left-right direction, the hinge points of the tie rods and the first hinge shafts are located on inner sides of the hinge points of the limiting rods and the second hinge shaft.

In some embodiments, in the left-right direction, the hinge points of the tie rods and the first hinge shafts are located between hinge points of the first connecting rods and the first hinge shafts and hinge points of the second connecting rods and the first hinge shafts, and the hinge points of the limiting rods and the second hinge shaft are located on outer sides of hinge points of the platform and the second hinge shafts and hinge points of the second connecting rods and the second hinge shafts.

In some embodiments, at least one of the first connecting rod and the second connecting rod includes a rod body, two first hinge lugs and two second hinge lugs, the two first hinge lugs are connected to a lower end of the rod body, and the two second hinge lugs are connected to an upper end of the rod body, the lower end of at least one of the first connecting rod and the second connecting rod is hinged by the two first hinge lugs, the upper end of at least one of the first connecting rod and the second connecting rod is hinged by the two second hinge lugs, and in the left-right direction, the two second hinge lugs are located on inner sides of the two first hinge lugs.

In some embodiments, the lifting drive mechanism is hinged to the second hinge shaft.

In some embodiments, the chassis includes a front chassis and a rear chassis, the front chassis and the rear chassis are successively arranged in a front-to-rear direction and hinged with each other, the traveling mechanism includes two drive wheel mechanisms, the two drive wheel mechanisms are arranged opposite to each other on left and right sides of the chassis, and each of the two drive wheel mechanisms includes a drive wheel.

In some embodiments, the drive wheel is arranged on the front chassis, and the front chassis and the rear chassis are hinged at a position offset forward relative to a rotation center of the drive wheel.

In some embodiments, the traveling mechanism includes as at least one of the following:

a first auxiliary wheel mechanism, arranged on the front chassis and including a wheel bracket and two first universal wheels, wherein the wheel bracket is hinged with the chassis, and the two first universal wheels are hinged to left and right ends of the wheel bracket; and a second auxiliary wheel mechanism, including two second universal wheels arranged on the rear chassis.

Based on the embodiments of the present application, the performance of AGVs is improved.

Other features and advantages of the present application will become apparent from the following detailed description of exemplary embodiments of the present application with reference to the accompanying drawings.

BRIEF DESCRIPTION OF THE DRAWINGS

To more clearly describe technical solutions in embodiments of the present application or in the prior art, a brief introduction to the drawings for use in description of embodiments or the prior art will be given below. Obviously, the drawings described below are only some embodiments in the present application, and to those of ordinary skill in the art, other drawings may also be obtained based on these drawings without creative work.

FIG. 1 is a schematic structural diagram of an AGV with a tray in a first position in embodiments of the present application.

FIG. 2 is a schematic structural diagram of an AGV with a tray rotated from a first position to a second position in embodiments of the present application.

FIG. 3 is a schematic structural diagram of an AGV after a tray ascends in embodiments of the present application.

FIG. 4 is a schematic structural diagram of an AGV after a tray descends in embodiments of the present application.

FIG. 14 is an exploded diagram of FIG. 13.

FIG. 15 is a state diagram of an elastic ball before being compressed in embodiments of the present application.

FIG. 16 is a state diagram of an elastic ball after being compressed in embodiments of the present application.

FIG. 17 is a structural diagram of a lifting mechanism in an ascending state in embodiments of the present application.

FIG. 18 is a structural diagram of a lifting mechanism in a descending state in embodiments of the present application.

FIG. 20 is a first three-dimensional view of a lifting drive mechanism without a rocker in embodiments of the present application.

FIG. 21 is a second three-dimensional view of a lifting drive mechanism without a rocker in embodiments of the present application.

FIG. 25 is a second three-dimensional view of an lifting mechanism in embodiments of the present application.

FIG. 26 is a structural diagram of a first connecting rod in embodiments of the present application.

FIG. 27 is a structural diagram of a second connecting rod in embodiments of the present application.

FIG. 28 is a structural diagram of a tie rod in embodiments of the present application.

FIG. 29 is a structural diagram of a limiting rod in embodiments of the present application.

DETAILED DESCRIPTION OF THE EMBODIMENTS

Figure 5:
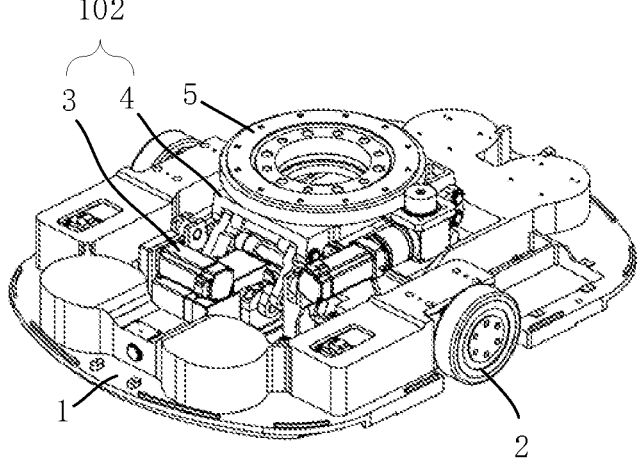
FIG. 5 is a schematic structural diagram of an AGV without a tray in embodiments of the present application.

Technical solutions in embodiments of the present application will be described below clearly and completely in conjunction with the accompanying drawings in the embodiments of the present application. Obviously, the described embodiments are only a part of the embodiments of the present application, and not all the embodiments. The following description of at least one exemplary embodiment is actually only illustrative, and in no way serves as any limitation on the present application and its application or use. All other embodiments obtained by those of ordinary skill in the art without creative work, based on the embodiments in the present application, fall into the protection scope of the present application.

Technologies, methods, and equipment known to those of ordinary skill in the related art may be not discussed in detail, but where appropriate, the technologies, methods, and equipment should be regarded as part of the specification.

In the description of the present application, it should be understood that the use of terms such as "first" and "second" to define parts and components is only for the convenience of distinguishing the corresponding parts and components. Unless otherwise stated, the above terms have no special meanings, and therefore cannot be construed as limitations on the protection scope of the present application.

In addition, technical features involved in different embodiments of the present application described below may be combined with each other so long as they do not conflict with each other.

FIGS. 1 to 30 exemplarily show the structure of an AGV in the present application.

In description of the present application, orientation or position relationships indicated by orientation words such as "front", "rear", "up", "down", "left", "right", "lateral", "vertical", "perpendicular", "horizontal", "top" and "bottom" are usually defined based on a state of the AGV when it is traveling normally, wherein a heading direction of the AGV is "front", a backing direction of the AGV is "rear", a direction same as that of gravity is "down", a direction opposed to that of gravity is "up", and left and right directions while facing "forward" are respectively "left" and "right". As shown in FIG. 1, a direction indicated by X is a front-rear direction, a direction indicated by Y is a left-right direction, and a direction indicated by Z is an up-down direction.

Referring to FIGS. 1 to 30, in embodiments of the present application, an AGV 100 includes:

a chassis 1;

a traveling mechanism 2, arranged on the chassis 1 to implement traveling of the AGV 100; and a supporting assembly 101, including a tray 6, a rotating assembly 5 and a lifting mechanism 102, the tray 6 being connected to the lifting mechanism 102 through the rotating assembly 5, the lifting mechanism 102 being arranged on the chassis 1 and including a lifting drive mechanism 3 and an lifting mechanism 4, the lifting drive mechanism 3 being in drive connection with the rotating assembly 5 through the lifting mechanism 4 to drive the rotating assembly 5 and the tray 6 to ascend or descend, and the rotating assembly 5 driving the tray 6 to rotate relative to the chassis 1.

Based on the above configuration, the tray 6 for carrying goods of the AGV 100 is capable of not only ascending and descending relative to the chassis 1 (see FIGS. 3 and 4), but also rotating relative to the chassis 1 (see FIGS. 1 and 2), such that the AGV 100 can flexibly and conveniently transfer goods with high transfer efficiency.

Figure 6:
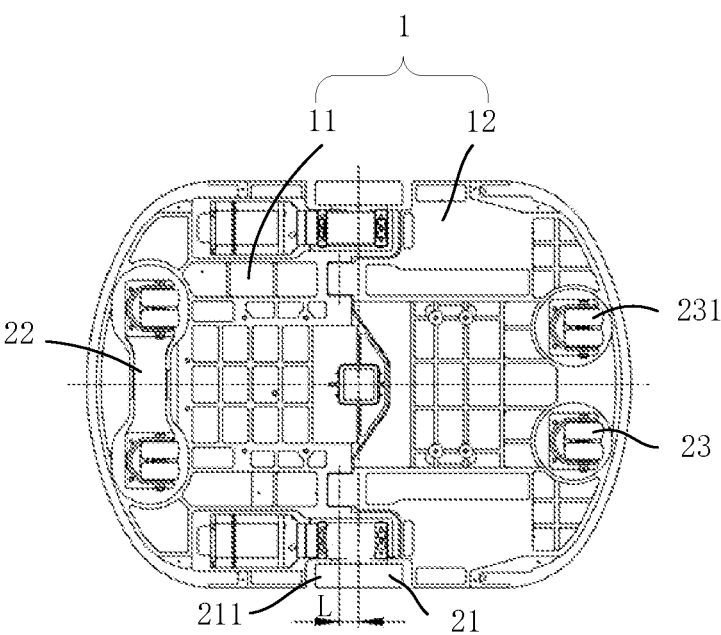
FIG. 6 is a bottom view of an AGV in embodiments of the present application.
Figure 7:
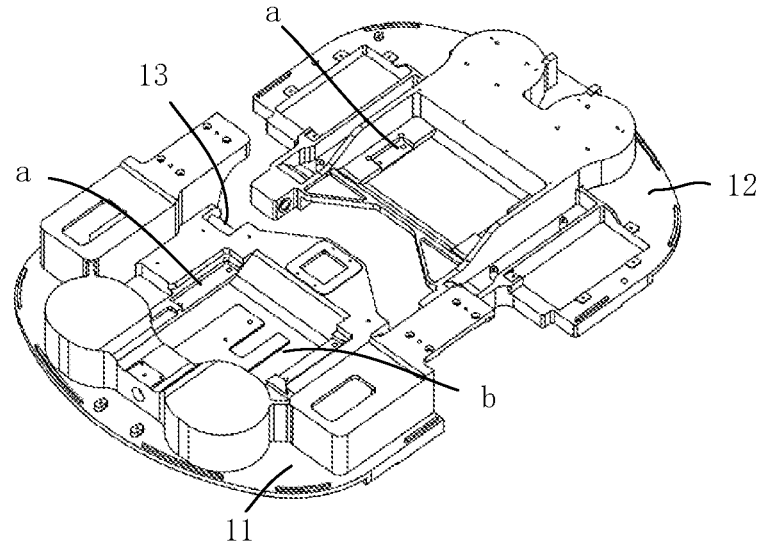
FIG. 7 is an exploded diagram of a chassis in embodiments of the present application.

The chassis 1 provides a mounting base for the traveling mechanism 2 and the supporting assembly 101. Referring to FIGS. 6 and 7, in some embodiments, the chassis 1 includes a front chassis 11 and a rear chassis 12. The front chassis 11 and the rear chassis 12 are successively arranged in a front-to-rear direction and hinged with each other. Specifically, as shown in FIG. 7, the front chassis 11 and the rear chassis 12 are hinged to a connecting shaft 13. The connecting shaft 13 is arranged on the front chassis 11. On such basis, the chassis 1 is a hinged chassis, and the front chassis 11 and the rear chassis 12 are rotatable within a certain angle range, in this way, compared with a case that the chassis 1 is an integral chassis, the chassis 1 can better adapt to undulations of road surfaces, such that wheels in the traveling mechanism 2 contacts the ground better, and the stressed state of the traveling mechanism 2 is improved.

Figures 8, 9:
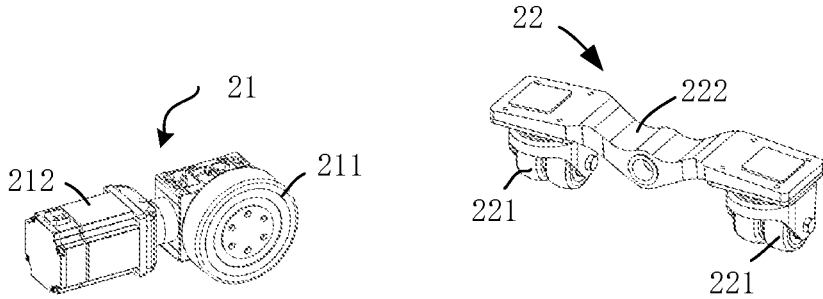
FIG. 8 is a structural diagram of a drive wheel mechanism in embodiments of the present application.
FIG. 9 is a structural diagram of a first auxiliary wheel mechanism in embodiments of the present application.

The traveling mechanism 2 is configured to implement traveling of the AGV 100. Referring to FIG. 6, in some embodiments, the traveling mechanism 2 includes two drive wheel mechanisms 21. The two drive wheel mechanisms 21 are arranged opposite to each other on left and right sides of the chassis 1 and both include a drive wheel 211. Referring to FIG. 8, each drive wheel mechanism 21 is also provided with a traveling motor 212. The traveling motor 212 is in drive connection with the drive wheel 211, so that the drive wheel 211 rotates to achieve a traveling function. The drive wheel mechanism 21 may be arranged on the front chassis 11.

Moreover, referring to FIG. 6, in some embodiments, the traveling mechanism 2 includes a first auxiliary wheel mechanism 22. The first auxiliary wheel mechanism 22 is arranged on the front chassis 11. For example, referring to FIG. 6, in conjunction with FIG. 9, in some embodiments, the first auxiliary wheel mechanism 22 includes a wheel bracket 222 and two first universal wheels 221. The wheel bracket 222 is hinged with the chassis 1, and the two first universal wheels 221 are hinged to left and right ends of the wheel bracket 222. In this way, the first auxiliary wheel mechanism 22 is hinged to the front chassis 11, and forms a three-point support with the two drive wheel mechanisms 21 arranged on the front chassis 11 to improve the adaptability to undulating road surfaces. As a variation, the first auxiliary wheel mechanism 22 may only include one first universal wheel 221. In this case, the first universal wheel 221 may be fixedly arranged on the front chassis 11.

In addition, referring to FIG. 6, in some embodiments, the traveling mechanism 2 includes a second auxiliary wheel mechanism 23. The second auxiliary wheel mechanism 23 is arranged on the rear chassis 12. For example, referring to FIG. 6, in some embodiments, the second auxiliary wheel mechanism 23 includes two second universal wheels 231. The two second universal wheels 231 are arranged on (e.g., hinged to or fixed to) the rear chassis 12. Alternatively, in some other embodiments, the second auxiliary wheel mechanism 23 may only include one second universal wheel 231. The one second universal wheel 231 is fixed to the rear chassis 12.

In the case where the traveling mechanism 2 includes two drive wheels 211, two first universal wheels 221 and two second universal wheels 231, the traveling mechanism 2 has 6 wheels, which facilitates implementing a steadier traveling process. Moreover, in the case where the chassis 1 is a hinged chassis with the front chassis 11 and the rear chassis 12 hinged with each other, the 6 wheels of the traveling mechanism 2 can well adapt to undulating road surfaces.

In the case where the chassis 1 includes the front chassis 11 and the rear chassis 12 hinged with each other, the drive wheels 211 can still come into good contact with the ground without turning up even if a road surface is uneven. That is to say, configuring the chassis 1 as a hinged chassis can effectively improve ground contact performance of the drive wheels 211, so that pressure values of the drive wheels 211 increase with the increase of a load, to meet the pressure demand of the drive wheels 211, prevent the drive wheels 211 from skidding, and improve the steadiness of traveling of the AGV 100.

In the front-rear direction X, the front chassis 11 and the rear chassis 12 may be hinged at a position offset relative to a rotation center of the drive wheel 211, so as to appropriately reduce the pressure on the drive wheels 211 and improve the stressed state of the traveling mechanism 2, while meeting the pressure demand of the drive wheels 211. For example, referring to FIG. 6, in the case where the drive wheels 211 are arranged on the front chassis 11, a hinged position of the front chassis 11 and the rear chassis 12 may be offset forward relative to the rotation center of the drive wheel 211. In this way, under the premise of meeting the pressure demand of the drive wheels 211, a certain pressure value can be distributed to the first auxiliary wheel mechanism 22, and the pressure values of the drive wheels 211 are appropriately reduced, such that forces on each wheel group are reasonably distributed, and the stressed state of the traveling mechanism 2 is improved. When the rotation center of the drive wheel 211 coincides with the center of the whole vehicle, the fact that the hinged position of the front chassis 11 and the rear chassis 12 is offset forward relative to the rotation center of the drive wheel 211 means that the hinged position of the front chassis 11 and the rear chassis 12 is offset forward relative to the center of the whole vehicle.

The tray 6 is configured to carry goods, rotate under the action of the rotating assembly 5, and lift up and down under the action of the lifting mechanism 102, so as to lift the goods and then move the goods to a designated position to flexibly implement transferring, picking up and placing of the goods.

The rotating assembly 5 is configured to connect the tray 6 and the lifting mechanism 102, and drives the tray 6 to rotate relative to the chassis 1, e.g., driving the tray 6 to rotate from a first position shown in FIG. 1 to a second position shown in FIG. 2, to facilitate picking up and placing of the goods. The lifting mechanism 102 is configured to connect the tray 6 and the chassis 1, and drives the tray 6 to lift up and down relative to the chassis 1, for example, causing the tray 6 to lift up and down between a higher position shown in FIG. 3 and a lower position shown in FIG. 4, to implement ascending and descending of the goods.

Next, the structures of the rotating assembly 5 and the lifting mechanism 102 will be introduced in sequence.

FIGS. 10 to 16 exemplarily show the structure of the rotating assembly 5.

Referring to FIGS. 10 to 16, the rotating assembly 5 includes a slewing bearing 51.

Figure 11:
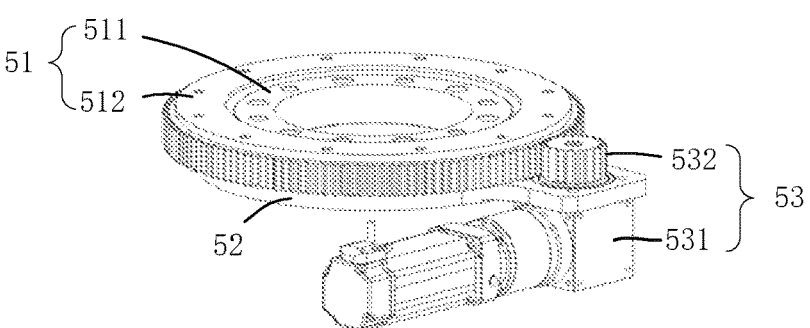
FIG. 11 is a structural diagram of a rotating assembly in embodiments of the present application.

The slewing bearing 51, also called a turntable bearing, is a bearing that can achieve relative rotation between a supported member (e.g., the tray 6) and a supporting device (e.g., the lifting mechanism 102), and can withstand a large axial force, radial force and upsetting moment at the same time. Referring to FIG. 11, the slewing bearing 51 includes an inner ring 511, an outer ring 512 and a rolling body (not shown in the figure). The outer ring 512 is annularly arranged outside the inner ring 511, and the rolling body is arranged between the outer ring 512 and the inner ring 511, such that the inner ring 511 and the outer ring 512 can rotate relative to each other. When installed into the AGV 100, the inner ring 511 is connected to the lifting mechanism 102 located on an axial side (specifically below) of the slewing bearing 51, and the outer ring 512 is connected to the tray 6 located on the other axial side (specifically above) of the slewing bearing 51, and is engaged with a rotary drive mechanism 53, such that under the driving action of the rotary drive mechanism 53, the outer ring 512 can rotate to drive the tray 6 to rotate relative to the chassis 1.

In the related art, no other components are provided between the slewing bearing 51 and the lifting mechanism 102, and the inner ring 511 is directly connected to the lifting mechanism 102. In the process of use, due to mechanical wear and a gear meshing clearance, etc., a gap between the tray 6 and the chassis 1 increases with the prolongation of the use time, resulting in aggravated shaking of the tray 6, which if serious, affects the normal operation of the AGV 100.

In view of the above situation, referring to FIGS. 10 to 16, in some embodiments, the rotating assembly 5 not only includes the slewing bearing 51, but also includes a damping assembly 52. The damping assembly 52 includes a connecting plate 52a and an elastic ball 52b. The connecting plate 52a is arranged below the outer ring 512 and is connected to the inner ring 511. The elastic ball 52b is arranged on the connecting plate 52a and is squeezed by the outer ring 512.

FIGS. 15 and 16 show the structure of the elastic ball 52b. Referring to FIGS. 15 and 16, the elastic ball 52b includes a ball 528, a sleeve 529, and a spring (not shown in the figures). The spring is arranged in the sleeve 529 and abuts between the ball 528 and the sleeve 529 to apply a pushing force to the ball 528, such that the ball 528 can move up and down with extension and contraction of the spring. When not squeezed by an external force, as shown in FIG. 15, the ball 528 is positioned higher, with more part exposed outside of the sleeve 529. After being squeezed by an external force, as shown in FIG. 16, the ball 528 moves downward, and the part exposed outside of the sleeve 529 decreases, and at this time, the amount of compression of the spring increases. During installation, referring to FIG. 12, the elastic ball 52b is located between the connecting plate 52a and the outer ring 512, and is pressed by the outer ring 512, and an extension-contraction direction of the spring of the elastic ball 52b is along an axial direction of the outer ring 512 (also the up-down direction Z), so that the ball 528 of the elastic ball 52b can move up and down under the action of the spring as a clearance between the outer ring 512 and the connecting plate 52a changes.

Since the ball 528 not only rotates, but also moves up and down, therefore, by providing the damping assembly 52 between the slewing bearing 51 and the lifting mechanism 102, using the damping assembly 52 to connect the slewing bearing 51 and the lifting mechanism 102, and using the outer ring 512 of the slewing bearing 51 to squeeze the ball 528 of the damping assembly 52, it can make up for the clearance caused by mechanical wear, etc. during the working process without affecting the normal operation of the slewing bearing 51, thus effectively reducing shaking between the tray 6 and the chassis 1.

On the one hand, the ball 528 squeezed by the outer ring 512 can apply a pushing force to the outer ring 512, and rotate with the outer ring 512 when the outer ring 512 rotates, therefore, the damping assembly 52 can not only ensure the normal operation of the slewing bearing 51, but also generate rotational resistance to improve the stability between the tray 6 and the lifting mechanism 102. On the other hand, the elastic ball 52b is extendable to make up for the clearance generated by mechanical wear, etc., therefore, the damping assembly 52 can provide a reliable pushing force and damping force for a long time and effectively reduce shaking between the tray 6 and the chassis 1.

As can be seen, by adding the damping assembly 52 between the slewing bearing 51 and the lifting mechanism 102, shaking between the tray 6 and the chassis 1 is reduced, the structural reliability of the AGV 100 is improved, and the operation steadiness of the AGV 100 is improved.

Figure 10:
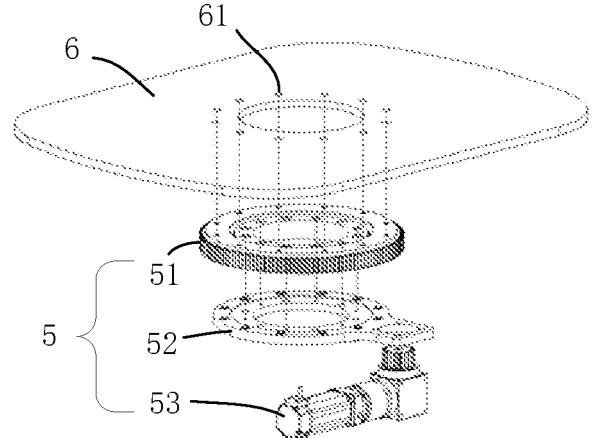
FIG. 10 is an exploded diagram of a rotating assembly and a tray in embodiments of the present application.
Figure 12:
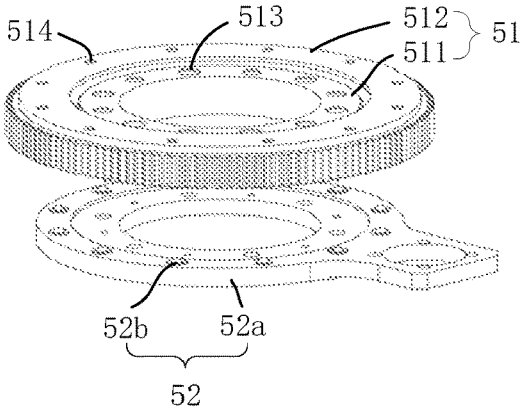
FIG. 12 is an exploded diagram of the rotating assembly without a rotary drive mechanism shown in FIG. 11.
Figure 13:
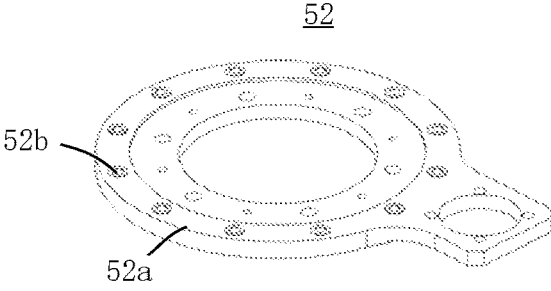
FIG. 13 is a structural diagram of a damping assembly in embodiments of the present application.

In order to achieve the connection between the outer ring 512 and the tray 6, referring to FIG. 10 and FIG. 12, in some embodiments, the outer ring 512 is provided with a first mounting hole 514, and correspondingly, the tray 6 is provided with a second mounting hole 61, and a connector (e.g., a threaded connector such as a bolt) passes through the first mounting hole 514 and the second mounting hole 61 to achieve the connection between the outer ring 512 and the tray 6, so that the slewing bearing 51 can drive the tray 6 to rotate.

In order to achieve the connection between the inner ring 511 and the connecting plate 52a, referring to FIGS. 10, 12 and 14, in some embodiments, the inner ring 511 is provided with a first connecting hole 513, the connecting plate 52a is provided with a second connecting hole 525, and a connectors (e.g., a threaded connector such as a bolt) passes through the first connecting hole 513 and the second connecting hole 525 to achieve the connection between the inner ring 511 and the connecting plate 52a. When the inner ring 511 and the connecting plate 52a are connected by the connectors, the slewing bearing 51 can progressively approach the connecting plate 52a under the action of the connector such as the bolt, so that the outer ring 512 progressively compresses the elastic balls 52b, thereby enabling the elastic balls 52b to apply the pushing force and damping force to the outer ring 512.

In order to achieve the connection between the connecting plate 52a and the lifting mechanism 102, referring to FIGS. 10, 14 and 25, in some embodiments, the lifting mechanism 102 is provided with a first assembly hole 411, the connecting plate 52a is provided with a second assembly hole 526, and a connector (e.g., a threaded connector such as a bolt) passes through the first assembly hole 411 and the second assembly hole 526 to achieve the connection between the connecting plate 52a and the lifting mechanism 102.

In the case where the connecting plate 52a is provided with both the aforementioned second connecting hole 525 and the aforementioned second assembly hole 526, referring to FIG. 14, the second connecting hole 525 and the second assembly hole 526 may be arranged alternately in a circumferential direction of the outer ring 512, so that the structure is more compact. Moreover, for convenience of distinction, the diameters of the second connecting hole 525 and the second assembly hole 526 may be different. For example, referring to FIG. 14, the diameter of the second connecting hole 525 may be smaller than that of the second assembly hole 526, or the diameter of the second connecting hole 525 may be larger than that of the second assembly hole 526. In this way, a risk of incorrect assembly is reduced, and an assembly efficiency is improved.

Next, the structure of the connecting plate 52a will be further described in conjunction with FIGS. 11 to 14.

Referring to FIGS. 11 to 14, in some embodiments, the connecting plate 52a is provided with an accommodating hole 523, and the elastic ball 52b is arranged in the accommodating hole 523. The accommodating hole 523 limits the elastic ball 52b to a certain extent, therefore, a reliability of arrangement of the elastic balls 52b is improved, so that the ball 528 of the elastic ball 52 ascends and descends only along the axial direction of the outer ring 512, but not moves in other directions, and thus the elastic ball 52b makes up for the clearance and reduces shaking of the tray 6 more reliably.

As shown in FIG. 14, the number of the accommodating holes 523 may be at least two (two or more). The at least two accommodating holes 523 are arranged spaced apart in the circumferential direction of the outer ring 512. For example, the at least two accommodating holes 523 are uniformly arranged on a same circumference in the circumferential direction of the outer ring 512. Each accommodating hole 523 accommodates an elastic ball 52b, such that elastic balls 52b are arranged in the accommodating holes 523 in one-to-one correspondence with the accommodating holes 523. Thus, the damping assembly 52 includes at least two elastic balls 52b, and the at least two elastic balls 52b are arranged spaced apart in the circumferential direction of the outer ring 512, such that the pushing and damping force to the slewing bearing 51 is applied more steadily.

In addition, referring to FIG. 14 and FIG. 11, in some embodiments, the connecting plate 52a is provided with a through hole 527, and the rotary drive mechanism 53 passes through the through hole 527 and is externally engaged with the outer ring 512 to drive the outer ring 512 to rotate. Specifically, in some embodiments, the rotary drive mechanism 53 includes a rotary motor 531 and a rotary gear 532. The rotary motor 531 (e.g., a deceleration motor) is in drive connection with the rotary gear 532, and the rotary gear 532 is located on a radially outer side of the outer ring 512 and engaged with the outer ring 512, so that the rotary drive mechanism 53 can drive the outer ring 512 to rotate, thereby driving the tray 6 to rotate. The rotary motor 531 is arranged on a side of the connecting plate 52a away from the outer ring 512. The rotary gear 532 passes through the through hole 527, is located on a side of the connecting plate 52a close to the outer ring 512, and is externally engaged with the outer ring 512.

Providing the through hole 527 on the connecting plate 52a for the rotary drive mechanism 53 to pass through can, on the one hand, achieve the connection between the connecting plate 52a and the rotary drive mechanism 53 to limit the rotary drive mechanism 53, and on the other hand, also facilitate the arrangement of the rotary drive mechanism 53 to save space and make the structure more compact.

In the embodiments described above, referring to FIG. 14, the connecting plate 52a may include a support portion 521 and an extension portion 522. The support portion 521 is connected to the inner ring 511. The elastic ball 52b is arranged on the support portion 521. The extension portion 522 extends from the support portion 521 toward a radially outer side of the outer ring 512. Specifically, referring to FIG. 14, in conjunction with FIG. 11, the support portion 521 is located directly below the outer ring 512 (i.e., located on a side of the outer ring 512 close to the lifting mechanism 102), and is substantially circular in shape and has an outer diameter substantially equal to that of the outer ring 512. The accommodating hole 523, second connecting hole 525 and second assembly hole 526 mentioned above are all arranged on the support portion 521, so that the elastic ball 52b is arranged on the support portion 521, and the support portion 521 connects the inner ring 511 and the lifting mechanism 102, so as to realize the support for the elastic ball 52b and the connection between the inner ring 511 and the lifting mechanism 102 by the connecting plate 52a. The extension portion 522 extends from the support portion 521 toward a radially outer side of the support portion 521 to form a projection, such that the overall shape of the connecting plate 52a is similar to that of a table tennis bat. The through hole 527 mentioned above is arranged on the extension portion 522, so that the extension portion 522 is connected to the rotary drive mechanism 53 to implement connection between the connecting plate 52a and the rotary drive mechanism 53.

Still referring to FIG. 14, in some embodiments, the support portion 521 is provided with a recess 524. The recess 524 is configured to accommodate the inner ring 511, so that the inner ring 511 is embedded in the recess 524. The second connecting hole 525 and the second assembly hole 526 are both provided in the recess 524, specifically on a bottom wall of the recess 524, and are arranged alternately with each other on a same circumference in the circumferential direction of the outer ring 512, so that the support portion 521 is connected to the inner ring 511 and the lifting mechanism 102 at the recess 524. In addition, the accommodating hole 523 is provided at an outer periphery of the recess 524, so that the elastic ball 52b is located at the outer periphery of the recess 524.

By embedding the inner ring 511 in the recess 524 and locating the elastic balls 52b at the outer periphery of the recess 524, it not only makes the structure more compact, but also facilitates the outer ring 512 squeezing the elastic ball 52b to achieve a damping effect of the damping assembly 52.

In summary, the rotating assembly 5 provided in the present application has a simple and compact structure, and can achieve, for a long time and reliably, steady rotation of the tray 6 relative to the chassis 1, thereby effectively reducing shaking of the tray 6.

FIGS. 17 to 30 exemplarily show the structure of a lifting mechanism 102 in the present application.

The lifting mechanism 102 is arranged on the chassis 1 and is located below the rotating assembly 5 to drive the rotating assembly 5 and the tray 6 to move up and down.

The lifting mechanism 102 includes a lifting drive mechanism 3 and a lifting mechanism 4. The lifting drive mechanism 3 is in drive connection with the rotating assembly 5 through the lifting mechanism 4, so as to drive the tray 6 to move up and down.

The lifting drive mechanism 3 provides lifting power. FIGS. 17 to 23 exemplarily show the structure of the lifting drive mechanism 3. In FIGS. 17 to 23, FIG. 19 shows a casing 37, while the other figures do not show the casing 37.

Referring to FIGS. 17 to 23, in some embodiments, the lifting drive mechanism 3 includes a first power assembly 3a and a second power assembly 3b. The first power assembly 3a is in drive connection with the lifting mechanism 4 through the second power assembly 3b.

Referring to FIG. 20, the first power assembly 3a includes a lifting motor 31, a speed reducer 32 and a first gear 33 successively in drive connection. The lifting motor 31 is in drive connection with the first gear 33 through the speed reducer 32, so as to drive the first gear 33 to rotate.

Figure 22:
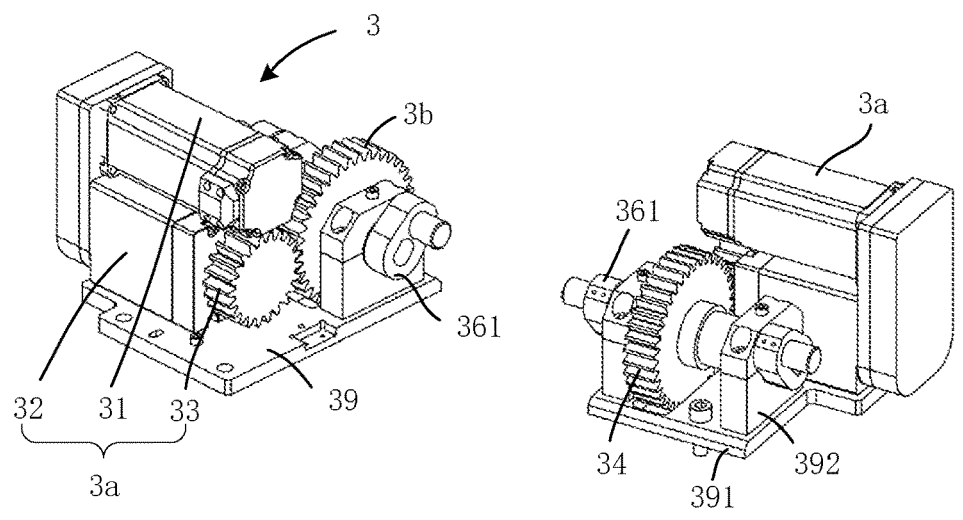
FIG. 22 is an exploded diagram of a second power assembly without a rocker in embodiments of the present application.
Figure 23:
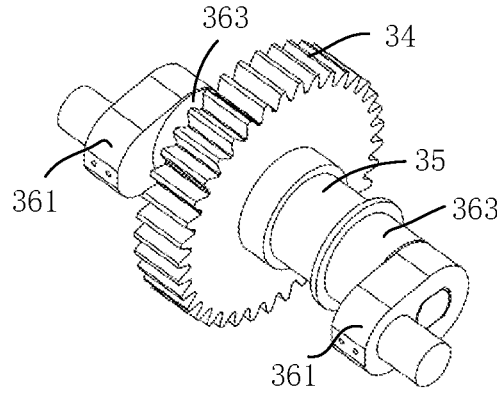
FIG. 23 is a structural diagram of a second power assembly without a rocker, a base and a pressure plate in embodiments of the present application.

Referring to FIGS. 21 to 23, the second power assembly 3b includes a second gear 34, a transmission shaft 35, a crank assembly 36, and a base 39. The second gear 34 is engaged with the first gear 33. The transmission shaft 35 passes through the second gear 34 and is supported by the base 39. The crank assembly 36 includes a crank 361, a rocker 362 (marked in FIG. 19) and a shaft sleeve 363. The shaft sleeve 363 and the crank 361 are successively sleeved on the transmission shaft 35 in a direction away from the second gear 34, and the rocker 362 is hinged with the crank 361 and the lifting mechanism 4.

In the related art, the lifting drive mechanism 3 drives the crank 361 directly by the first power assembly 3a, without the second gear 34, transmission shaft 35 and shaft sleeve 363 arranged between the first power assembly 3a and the crank 361. In this case, the speed reducer 32 drives the crank 361 directly by the first gear 33, and the speed reducer 32 not only needs to output a torque, but also needs to bear a radial force, especially at two limiting positions shown in FIG. 17 and FIG. 18, the speed reducer 32 needs to bear a large radial force, therefore, the speed reducer 32 is liable to be damaged.

Different from the solution of the related art, in embodiments of the present application, the second gear 34, the transmission shaft 35 and the shaft sleeve 363 are provided between the first gear 33 and crank 361, so that the speed reducer 32 only performs a task of outputting a torque and does not bear a radial force, and the radial force is borne by the second power assembly 3b, therefore, the risk of damage of the speed reducer 32 is reduced and the reliability of the lifting drive mechanism 3 is improved.

The base 39 is arranged on the chassis 1 to support the transmission shaft 35 and bear the radial force. Referring to FIG. 22, in some embodiments, the base 39 includes a bottom plate 391 and two supports 392. The bottom plate 391 is arranged on the chassis 1, for example on the front chassis 11, and is arranged at a position b of the front chassis 11 as shown in FIG. 7, so that the lifting drive mechanism 3 is arranged on the front chassis 11. In the left-right direction Y, the position b is located in the middle, and in the front-rear direction X, the position b is located between the first auxiliary wheel mechanism 22 and the hinged position (i.e., connecting shaft 13) of the front chassis and the rear chassis. The two supports 392 are provided on the bottom plate 391 and are arranged spaced apart in the left-right direction Y to support two axial ends of the transmission shaft 35. As shown in FIG. 22, the two supports 392 are both provided with a second slot portion 393, and the two axial ends of the transmission shaft 35 are placed on the two second slot portions 393 and are supported by the two supports 392. Furthermore, referring to FIG. 20, in some embodiments, the first power assembly 3a is also arranged on the base 39, specifically on the bottom plate 391.

The shaft sleeve 363 is rotatably sleeved on the transmission shaft 35, and the crank 361 is non-rotatably sleeved on the transmission shaft 35. In order to achieve the non-rotatable connection between the crank 361 and the transmission shaft 35, referring to FIG. 22, in some embodiments, the transmission shaft 35 is provided with a plane 351, and the crank 361 is provided with an oblong hole 36a. An inner wall, as a plane, of the oblong hole 36a cooperates with the plane 351 to prevent the crank 361 from rotating relative to the transmission shaft 35, so that the transmission shaft 35 can drive the crank 361 to rotate while rotating under the action of the second gear 34, thereby driving the rocker 362 to rotate and transmitting the power to the lifting mechanism 4 to drive the tray 6 to move up and down.

In addition to including the crank 362, the rocker 362 and the shaft sleeve 363, referring to FIG. 22, in some embodiments, the crank assembly 36 further includes a pressure plate 364. The pressure plate 364 cooperates with the base 39 to limit the shaft sleeve 363 and the like. Specifically, as shown in FIG. 22, the pressure plate 364 is provided with a first slot portion 36b. The first slot portion 36b cooperates with the second slot portion 393 on the base 39 to form a closed slot, so that the displacement of the shaft sleeve 363 and the like is restricted, and installation and fixation of a crank gear mechanism (including the second gear 34, the transmission shaft 35, the crank 362 and the shaft sleeve 363) on the base 39 is realized. The first slot portion 36b and the second slot portion 393 may both be semicircular slots.

Figure 19:
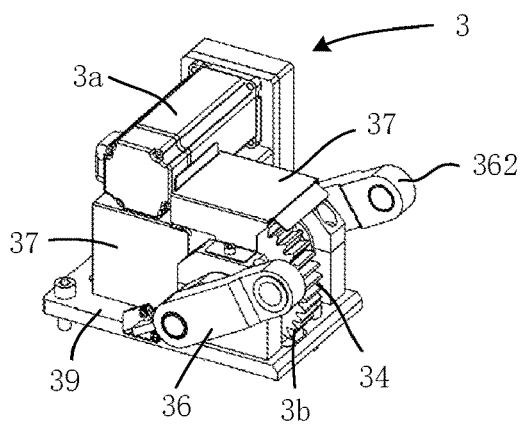
FIG. 19 is a structural diagram of a lifting drive mechanism in embodiments of the present application.

Referring to FIG. 19, in some embodiments, the rocker 362 is hinged to a side of the crank 361 away from the second gear 34. In this case, in the left-right direction Y, the rocker 362 is hinged to an outer side of the crank 361, which, compared with a case where the rocker 362 is hinged on an inner side of the crank 361 (i.e., the rocker 362 is hinged on a side of the crank 361 close to the second gear 34), achieves that the crank 361 and the rocker 362 do not interfere with each other, and the ranges of rotation of the crank 361 and the rocker 362 are increased, so that the crank 361 and the rocker 362 can rotate 360° without a dead point. In this way, the lifting motor 31 only needs to rotate in one direction to achieve reciprocating motion of ascending and descending. Since the lifting motor 31 does not need to rotate forwardly and reversely to achieve ascending and descending, upper and lower mechanical limits can be omitted, thus simplifying the structure. Moreover, the lifting motor 31 does not need to frequently switch the direction of rotation, which is also conducive to improving the working reliability of the lifting motor 31 and extending the service life of the lifting motor 31. The casing 37 shown in FIG. 19, which covers the first gear 33 and the second gear 34, not only makes the appearance more pleasing aesthetically, but also protects the first gear 33 and the second gear 34 to some extent.

Referring to FIGS. 17 to 19, in some embodiments, the lifting drive mechanism 3 includes two crank assemblies 36. The two crank assemblies 36 are arranged on two axial sides of the second gear 34 and hinged with different positions of the lifting mechanism 4. On such basis, two hinge points are provided between the lifting drive mechanism 3 and the lifting mechanism 4, and there are two force bearing points during ascending and descending, which can effectively improve the steadiness of ascending and descending as compared with a case where there is only one force bearing point between the lifting drive mechanism 3 and the lifting mechanism 4.

When assembling the lifting drive mechanism 3 shown in FIGS. 19 to 23, the second gear 34 may be first sleeved on the transmission shaft 35, and then the two shaft sleeves 363 are sleeved thereon, and thereafter the two cranks 361 are sleeved on the transmission shaft 35, thus completing assembly of the crank gear mechanism shown in FIG. 23. Then, the crank gear mechanism shown in FIG. 23 is placed in the second slot portions 393 on the base 39, so that the base 39 supports the crank gear mechanism, and the second gear 34 is engaged with the first gear 33, and thereafter the crank gear mechanism is fixed by the two pressure plates 364, and the two rockers 362 are hinged to the two cranks 361.

The lifting mechanism 4 connects the lifting drive mechanism 3 and the rotating assembly 5 to achieve power transmission between the lifting drive mechanism 3 and the rotating assembly 5, so that the rotating assembly 5 can drive the tray 6 to move up and down under the drive of the lifting drive mechanism 3.

The lifting mechanism 4 may adopt a linear slider structure, a spiral screw structure or a multi-link structure. Accordingly, the lifting mechanism 102 is called a linear slider lifting mechanism, a spiral screw lifting mechanism or a multi-link lifting mechanism, respectively.

FIGS. 24 to 30 exemplarily show a lifting mechanism 4 adopting a multi-link structure.

Referring to FIGS. 24 to 30, in some embodiments, the lifting mechanism 4 includes:

a seat 4a, arranged on the chassis 1;

a first rod assembly 4b, including two first connecting rods 42 and two tie rods 46, the two first connecting rods 42 being arranged spaced apart in a front-rear direction X, lower ends of the two first connecting rods 42 being hinged with the seat 4a, and the two tie rods 46 being arranged spaced apart in a left-right direction Y, front and rear ends of the tie rods 46 being respectively hinged with upper ends of the two first connecting rods 42 to first hinge shafts 44; and a second rod assembly 4c, arranged above the first rod assembly 4b and including a platform 41, two second connecting rods 43 and two limiting rods 47, the two second connecting rods 43 being arranged spaced apart in the front-rear direction X, lower ends of the two second connecting rods 43 being respectively hinged to the two first hinge shafts 44, front and rear ends of the platform 41 being respectively hinged with upper ends of the two second connecting rods 43 to second hinge shafts 45, the two limiting rods 47 being arranged spaced apart along the left-right direction Y, front ends of the limiting rods 47 being hinged with the seat 4a, and rear ends of the limiting rods 47 being hinged with the second hinge shaft 45.

Based on the above configuration, the lifting mechanism 4 is a multi-link lifting mechanism, and includes parallelogram mechanisms in an upper layer and a lower layer, which are respectively a first parallelogram mechanism located below formed by the seat 4a, the two first connecting rods 42 and the two tie rods 46, and a second parallelogram mechanism located above formed by the two tie rods 46, the two second connecting rods 43 and the platform 41. The two tie rods 46 are connected between the two first connecting rods 42, and front and rear ends of each tie rod 46 are respectively hinged with the two first connecting rods 42 to two first hinge shafts 44, forming the first parallelogram mechanism. Upper and lower ends of each of the two second connecting rods 43 are respectively hinged with the platform 41 and the upper end of the first connecting rods 42, forming the second parallelogram mechanism. Front and rear ends of each of the two limiting rods 47 are respectively hinged with the seat 4a and the second hinge shaft 45. The rear end of the limiting rod 47 is hinged with the second hinge shaft 45, and the front end of the limiting rod 47 is hinged with the seat 4a, so that the platform 41 is restricted by the limiting rods 47 during ascending and descending. In this way, the platform 41 has almost no displacement in the front-rear direction X, and only displaces in the up-down direction Z, thereby ascending and descending more steadily.

The first parallelogram mechanism and the second parallelogram mechanism are driven by the lifting drive mechanism 3 to extend and ascend or retract and descend, thereby driving the tray 6 to ascend or descend. Referring to FIG. 17, when the lifting drive mechanism 3 drives the lifting mechanism 4 to extend and ascend, an ascending process is achieved. Referring to FIG. 18, when the lifting drive mechanism 3 drives the lifting mechanism 4 to retract and descend, a descending process is achieved.

In the related art, hinge points of the tie rods 46 and the first hinge shafts 44 are not staggered with hinge points of the limiting rods 47 and the second hinge shaft 45 in the left-right direction Y, and the tie rods 46 or the limiting rods 47 need to be designed in a "C" or "bow" shape in order to avoid interference therebetween during ascending and descending. However, in the case where the tie rods 46 or the limiting rod 47 are in a "C" or "bow" shape, not only the structure of the whole lifting mechanism 4 is complex, but also the tie rods 46 and limiting rods 47 are prone to elastic deformation under a high load, resulting in poor parallelism between the tray 6 and a vehicle body, which affects the steadiness of transport.

Figure 24:
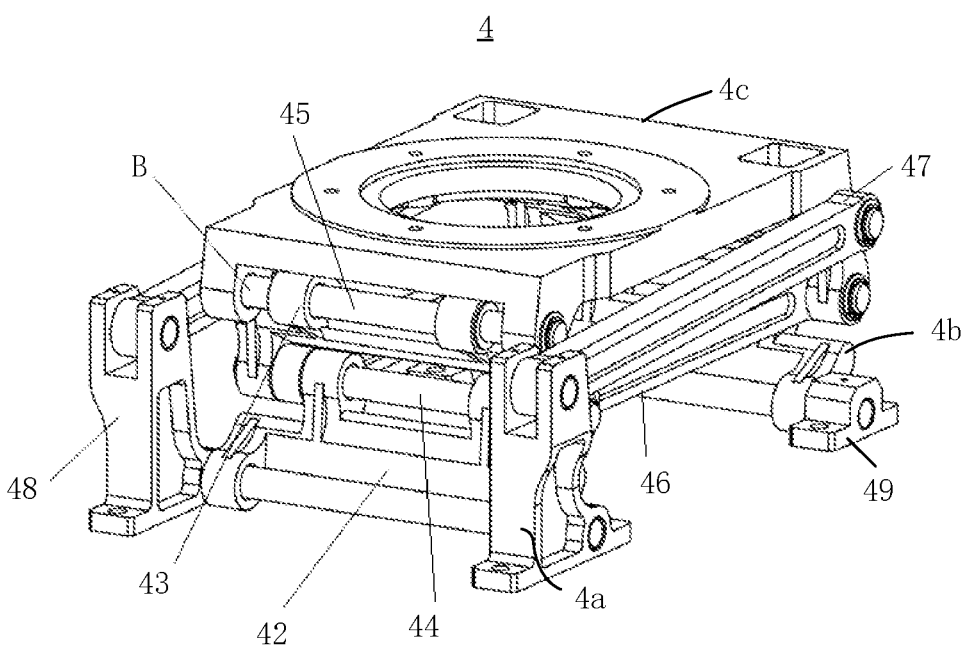
FIG. 24 is a first three-dimensional view of an lifting mechanism in embodiments of the present application.

In view of the above situation, referring to FIGS. 24 to 25, in some embodiments, hinge points of the tie rods 46 and the first hinge shafts 44 are staggered with hinge points of the limiting rods 47 and the second hinge shaft 45 in the left-right direction Y.

Since the hinge points of the tie rods 46 and the first hinge shafts 44 are staggered with the hinge points of the limiting rods 47 and the second hinge shaft 45 in the left-right direction Y, during ascending and descending, the tie rods 46 and the limiting rods 47 are staggered, and their positions do not overlap. That is to say, interference between the tie rods 46 and the limiting rods 47 during ascending and descending is avoided, such that there is no need for a special design of the shape of the tie rods 46 and the limiting rods 47 (e.g., a "C" or "bow" shape) to prevent interference, thus making it possible for the tie rods 46 and the limiting rods 47 to adopt a straight rod structure, which is conducive not only to simplifying the structure, but also to improving the parallelism between the platform 41 and a vehicle body. Since the platform 41 is connected to the rotating assembly 5 and supports the tray 6, an improvement of the parallelism between the platform 41 and the vehicle body means that the parallelism between the tray 6 and the vehicle body is improved, which improves the steadiness of transport.

As shown in FIGS. 24 to 25 and FIGS. 28 to 29, the tie rods 46 and the limiting rods 47 are all straight rods. Elastic deformation of a straight rod is less than that of a C- or bow-shaped rod with the same material and cross-sectional area, therefore, configuring the tie rods 46 and the limiting rods 47 as straight rods can reduce the elastic deformation of the tie rods 46 and the limiting rods 47, increase the parallelism between the tray 6 and the vehicle body, and achieve a steadier transfer process.

Hence, arranging the hinge points of the tie rods 46 and the first hinge shafts 44 and the hinge points of the limiting rods 47 and the second hinge shaft 45 in a staggered manner in the left-right direction Y, and configuring the tie rods 46 and the limiting rods 47 as straight rods not only can prevent motion interference between the tie rods 46 and the limiting rods 47, but also can increase the parallelism between the tray 6 and the vehicle body, thereby achieving a steadier transfer process.

As an implementation of arranging the hinge points of the tie rods 46 and the first hinge shafts 44 and the hinge points of the limiting rods 47 and the second hinge shaft 45 in a staggered manner in the left-right direction Y, referring to FIG. 25, in the left-right direction Y, the hinge points of the tie rods 46 and the first hinge shafts 44 are located on inner sides of the hinge points of the limiting rods 47 and the second hinge shaft 45. For example, in conjunction with FIGS. 24 to 27, in some embodiments, in the left-right direction Y, the hinge points of the tie rods 46 and the first hinge shafts 44 are located between hinge points of the first connecting rods 42 and the first hinge shafts 44 and hinge points of the second connecting rods 43 and the first hinge shafts 44, and the hinge points of the limiting rods 47 and the second hinge shaft 45 are located on outer sides of hinge points of the platform 41 and the second hinge shafts 45 and hinge points of the second connecting rods 43 and the second hinge shafts 45. In this way, the limiting rods 47 and the tie rods 46 are arranged in a more reasonable manner, which can simplify the structure more effectively and optimize the parallelism between the platform 41 and the chassis 1.

FIGS. 26 and 27 show the structures of the first connecting rod 42 and the second connecting rod 43.

Referring to FIG. 26, in some embodiments, the first connecting rod 42 includes a rod body 421, two first hinge lugs 422 and two second hinge lugs 423, the two first hinge lugs 422 being connected to a lower end of the rod body 421, and the two second hinge lugs 423 being connected to an upper end of the rod body 421. A lower end of the first connecting rod 42 is hinged by the two first hinge lugs 422, i.e., the lower end of the first connecting rod 42 is hinged with the seat 4a through the two first hinge lugs 422. An upper end of the first connecting rod 42 is hinged by means of the two second hinge lugs 423, i.e., the upper end of the first connecting rod 42 is hinged with the first hinge shaft 44 through the two second hinge lugs 423. As shown in FIG. 26, in the left-right direction Y, the two second hinge lugs 423 are located on inner sides of the two first hinge lugs 422. In this way, the first connecting rod 42 can be a one-piece structure, and upper and lower hinge points of the first connecting rods 42 can be staggered.

Referring to FIG. 27, in some embodiments, the second connecting rod 43 includes a rod body 421, two first hinge lugs 422 and two second hinge lugs 423, the two first hinge lugs 422 being connected to a lower end of the rod body 421, and the two second hinge lugs 423 being connected to an upper end of the rod body 421. A lower end of the second connecting rod 43 is hinged by the two first hinge lugs 422, i.e., the lower end of the second connecting rod 43 is hinged with the first hinge shaft 44 by the two first hinge lugs 422. An upper end of the second connecting rod 43 is hinged by means of the two second hinge lugs 423, i.e., the upper end of the second connecting rod 43 is hinged with the second hinge shaft 45 by the two second hinge lugs 423. As shown in FIG. 27, in the left-right direction Y, the two second hinge lugs 423 are located on inner sides of the two first hinge lugs 422. In this way, the second connecting rod 43 can be a one-piece structure, and upper and lower hinge points of the second connecting rod 43 can be staggered.

In the case where the first connecting rod 42 and the second connecting rod 43 both adopt the structures as shown in FIGS. 26 and 27, the first connecting rod 42 and the second connecting rod 43 have the same structure, such that four connecting rods (i.e., two first connecting rods 42 and two second connecting rods 43) of the lifting mechanism 4 have the same structure, which is conducive to reducing the types of connecting rods in the lifting mechanism 4, simplifying the structure and facilitating assembly.

Moreover, the first connecting rod 42 and the second connecting rod 43 both adopt a structure in which the two second hinge lugs 423 are located on the inner sides of the two first hinge lugs 422 in the left-right direction Y, which also facilitates that the hinge points of the tie rods 46 and the first hinge shafts 44 are located on the inner sides of the hinge points of the limiting rods 47 and the second hinge shaft 45 in the left-right direction Y, so as to achieve that the hinge points of the tie rods 46 and the first hinge shafts 44 are staggered with the hinge points of the limiting rods 47 and the second hinge shaft 45 in the left-right direction Y. Specifically, referring to FIG. 25, in conjunction with FIGS. 26 to 27, in the case where the two second hinge lugs 423 of both the first connecting rod 42 and the second connecting rod 43 are located on the inner sides of the two first hinge lugs 422 in the left-right direction Y, the second connecting rod 43 has two hinge points with the first hinge shaft 44, corresponding to the two first hinge lugs 422 of the second connecting rod 43, and the first connecting rod 42 has two hinge points with the first hinge shaft 44, corresponding to the two second hinge lugs 423 of the first connecting rod 42. Since the two first hinge lugs 422 of the second connecting rod 43 are located on outer sides of the two second hinge lugs 423 of the first connecting rod 42 in the left-right direction Y, there are gaps A between the first hinge lugs 422 and the second hinge lugs 423 which are connected to the first hinge shaft 44 and adjacent to each other. In this way, the tie rods 46 can be hinged in the gaps A, such that the hinge points of the tie rods 46 are located between the hinge points of the first connecting rods 42 and the second connecting rods 43 with the first hinge shaft 44. Moreover, as shown in FIGS. 25 to 27, the second connecting rod 43 has two hinge points with the second hinge shaft 45, corresponding to the two second hinge lugs 423 of the second connecting rod 43 respectively, and the two second hinge lugs 423 of the second connecting rod 43 are located between the two hinge points of the platform 41 and the second hinge shaft 45. In this way, as long as the rear ends of the limiting rods 47 are hinged to outer sides of the hinge points of the platform 41 and the second hinge shaft 45 in the left-right direction Y, the rear ends of the limiting rods 47 are hinged to outer sides of the hinge points of the tie rods 46 in the left-right direction Y, to achieve staggered arrangement of hinge points of the limiting rods 47 and the second hinge shaft 45 and the hinge points of the tie rods 46 and the first hinge shaft 44 in the left-right direction Y.

Returning to FIGS. 24 to 25, in conjunction with FIGS. 17 to 18, in some embodiments, when being hinged with the lifting mechanism 4, the lifting drive mechanism 3 is hinged to the second hinge shaft 45. In this case, hinge points of the lifting drive mechanism 3 and the lifting mechanism 4 are higher, which, compared with a case where the lifting drive mechanism 3 is hinged to the first hinge shaft 44 at lower hinged positions, is more conducive to improving the stressed state, and reducing a fracture risk of the rockers 362.

The lifting mechanism 102 will be further described below in conjunction with FIGS. 17 to 30.

As shown in FIGS. 17 to 30, in this embodiment, the lifting mechanism 102 includes the lifting drive mechanism 3 and the lifting mechanism 4. A gear mechanism (including a lifting motor 31, a speed reducer 32, a first gear 33, a second gear 34 and a transmission shaft 35) of the lifting drive mechanism 3 drives a crank 361 to rotate, and the crank 361 drives a rocker 362 to rotate, so that the rocker 362 can drive the lifting mechanism 4 hinged therewith to move in the up-down direction Z to implement ascending and descending.

As shown in FIGS. 24 to 30, the lifting mechanism 4 includes a seat 4a, a platform 41, two first connecting rods 42, two second connecting rods 43, two tie rods 46, and two limiting rods 47.

The seat 4a is arranged on the chassis 1 and includes two first seats 48 and two second seats 49. Referring to FIGS. 24 to 25, in conjunction with FIGS. 5 and 7, the two first seats 48 are arranged on the front chassis 11 and spaced apart in the left-right direction Y, and are respectively located at two mounting positions a on the front chassis 11. The two second seats 49 are arranged on the rear chassis 12 and spaced apart in the left-right direction Y, and are respectively located at two mounting positions a on the rear chassis 12. The second seat 49 and the first seat 48 located on a same side in the left-right direction Y are opposite to each other in the front-rear direction X.

Figure 30:
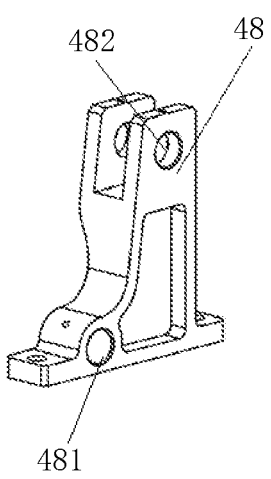
FIG. 30 is a structural diagram of a first seat in embodiments of the present application.

The two first seats 48 are located on outer sides of the first connecting rod 42 in the left-right direction Y. Upper ends of the two first seats 48 are respectively hinged with front ends of the two limiting rods 47. Lower ends of the two first seats 48 are hinged with a lower end of one first connecting rod 42, which is located in the front, of the two first connecting rods 42. As shown in FIG. 30, the first seat 48 is provided with a first hinge hole 481 at the bottom and a second hinge hole 482 at the top, wherein the first hinge hole 481 is configured for hinging with the first connecting rod 42, and the second hinge hole 482 is configured for hinging with the limiting rod 47.

The two second seats 49 are located on outer sides of the first connecting rod 42 in the left-right direction Y. The two second seats 49 are hinged with a lower end of one first connecting rod 42, which is located in the rear, of the two first connecting rods 42.

In the two first connecting rods 42, the lower end of one first connecting rod 42 located in the front is hinged to the first seats 48, and the lower end of the other first connecting rod 42 located in the rear is hinged to the second seats 49. In the first connecting rod 42 and the second connecting rod 43 on a same side in the front-rear direction X, a lower end of the second connecting rod 43 is hinged with an upper end of the first connecting rod 42 to a first hinge shaft 44. Upper ends of the two second connecting rods 43 are respectively hinged with front and rear ends of the platform 41 to second hinge shafts 45. The two tie rods 46 are hinged between two first hinge shafts 44. The limiting rods 47 are hinged between the first seats 48 and the second hinge shaft 45 located in the rear. In this way, in a height direction, a first parallelogram mechanism is formed between the seat 4a, the two first connecting rods 42 and the two tie rods 46, and a second parallelogram mechanism is formed between the platform 41, the two tie rods 46 and the two second connecting rods 43. Driven by the rockers 362, the two parallelogram mechanisms change their shapes to implement ascending and descending.

In the embodiment, the two first connecting rods 42 and the two second connecting rods 43 have the same structure. As shown in FIGS. 26 and 27, the first connecting rods 42 and the second connecting rods 43 both include a rod body 421, two first hinge lugs 422, and two second hinge lugs 423. The two first hinge lugs 422 are connected to a lower side of the rod body 421 and are arranged spaced apart from each other in the left-right direction Y. The two second hinge lugs 423 are connected to an upper side of the rod body 421 and are arranged spaced apart from each other in the left-right direction Y. In the left-right direction Y, the two second hinge lugs 423 are located on inner sides of the two first hinge lugs 422, and gaps A are provided between the second hinge lugs 423 and the first hinge lugs 422. Thus, in conjunction with FIGS. 25 to 27, when the lower end of the second connecting rod 43 is hinged with the upper end of the first connecting rod 42, gaps A are formed between the first hinge lugs 422 of the second connecting rod 43 and the second hinge lugs 423 of the first connecting rod 42.

As shown in FIGS. 24 to 25, the tie rods 46 are hinged to the first hinge shafts 44, and hinge points of the tie rods 46 are located at the gaps A between the first hinge lugs 422 of the second connecting rods 43 and the second hinge lugs 423 of the first connecting rods 42. Rear ends of the limiting rods 47 are hinged to the second hinge shaft 45 and is located on outer sides of the platform 41 in the left-right direction Y.

Based on the above configuration, in the left-right direction Y, not only are hinge points of the rear ends of the limiting rods 47 located on outer sides of the hinge points of the tie rods 46, but also hinge points of the front ends of the limiting rods 47 are located on outer sides of the hinge points of the tie rods 46. That is to say, all the hinge points of the limiting rods 47 are located on outer sides of all the hinge points of the tie rods 46. In this way, the tie rods 46 and the limiting rods 47 are staggered overall in the left-right direction Y, and there is no motion interference therebetween. On this basis, as shown in FIGS. 28 and 29, in the embodiment, the tie rod 46 and the limiting rod 47 are both straight rods, so that their elastic deformation under force can be small, thereby improving the parallelism between the platform 41 and the vehicle body.

In this embodiment, in conjunction with FIGS. 17 to 18 and FIG. 24, the two rockers 362 are hinged with the second hinge shaft 45, and in the left-right direction Y, the two rockers 362 are hinged at gaps B between the second hinge lugs 423 of the second connecting rods 43 and hinge lugs of the platforms 41.

A working process of the lifting mechanism of this embodiment is as follows: the cranks 361 rotate under the drive of the lifting motor 31 and the gear mechanism, and drives the rockers 362 to rotate, so that the rockers 362 drive the two parallelogram mechanisms of the lifting mechanism 4 to deform, thus implementing ascending and descending of the platform 41, thereby driving the rotating assembly 5 and the tray 6 to ascend and descend.

In summary, based on improvements of the rotating assembly 5, the lifting drive mechanism 3, the lifting mechanism 4, the chassis 1, the traveling mechanism 2 and the like, the AGV 100 provided in embodiments of the present application has a simple and compact structure, and operates steadily and reliably.

Described above are only exemplary embodiments of the present application, which are not intended to limit the present application, and all modifications, equivalent substitutions, improvements and the like made within the spirit and principle of the present application should be encompassed within the protection scope of the present application.

The invention claimed is:

1. An automatic guided vehicle, comprising:
   a chassis;
   a traveling mechanism, arranged on the chassis to implement traveling of the automatic guided vehicle; and
   a supporting assembly, comprising a tray, a rotating assembly and a lifting mechanism, the tray is connected to the lifting mechanism through the rotating assembly, the lifting mechanism is arranged on the chassis and comprises a lifting drive mechanism and a lifting mechanism, the lifting drive mechanism is in drive connection with the rotating assembly through the lifting mechanism to drive the rotating assembly and the tray to ascend or descend, and the rotating assembly drives the tray to rotate relative to the chassis;
   wherein the rotating assembly comprises:
   a slewing bearing, comprising an inner ring and an outer ring, the outer ring being rotatably sleeved outside the inner ring; and
   a damping assembly, comprising a connecting plate and an elastic ball, the connecting plate being arranged on an axial side of the outer ring and connected to the inner ring, and the elastic ball being arranged on the connecting plate and being squeezed by the outer ring.

2. The automatic guided vehicle according to claim 1, wherein the damping assembly comprises at least two elastic balls, and the at least two elastic balls are arranged spaced apart in a circumferential direction of the outer ring.

3. The automatic guided vehicle according to claim 1, wherein the connecting plate is provided with an accommodating hole, and the elastic ball is arranged in the accommodating hole.

4. The automatic guided vehicle according to claim 1, wherein the lifting drive mechanism comprises:
   a first power assembly, comprising a lifting motor, a speed reducer and a first gear successively in drive connection; and
   a second power assembly, comprising a second gear, a transmission shaft, a crank assembly and a base, the second gear being engaged with the first gear, the transmission shaft passing through the second gear and being supported by the base, the crank assembly comprising a crank, a rocker and a shaft sleeve, the shaft sleeve and the crank being successively sleeved on the transmission shaft in a direction away from the second gear, and the rocker and the crank being hinged with the lifting mechanism.

5. The automatic guided vehicle according to claim 4, wherein the rocker is hinged to a side of the crank away from the second gear.

6. The automatic guided vehicle according to claim 4, wherein the lifting drive mechanism comprises two crank assemblies, and the two crank assemblies are arranged on two axial sides of the second gear and hinged with different positions of the lifting mechanism.

7. The automatic guided vehicle according to claim 1, wherein the lifting mechanism comprises:
   a seat arranged on the chassis;
   a first rod assembly, comprising two first connecting rods and two tie rods, the two first connecting rods being arranged spaced apart in a front-rear direction, lower ends of the two first connecting rods being hinged with the seat, and the two tie rods being arranged spaced apart in a left-right direction, front and rear ends of each of the tie rods being respectively hinged with upper ends of the two first connecting rods to first hinge shafts; and
   a second rod assembly, arranged above the first rod assembly and comprising a platform, two second connecting rods and two limiting rods, the two second connecting rods being arranged spaced apart in the front-rear direction, lower ends of the two second connecting rods being respectively hinged to two first hinge shafts, front and rear ends of the platform being respectively hinged with upper ends of the two second connecting rods to second hinge shafts, the two limiting rods being arranged spaced apart along the left-right direction, front ends of the limiting rods being hinged with the seat, and rear ends of the limiting rods being hinged with the second hinge shaft;
   wherein in the left-right direction, hinge points of the tie rods and the first hinge shafts are arranged staggered with hinge points of the limiting rods and the second hinge shaft, and the tie rods and the limiting rods are straight rods.

8. The automatic guided vehicle according to claim 7, wherein in the left-right direction, the hinge points of the tie rods and the first hinge shafts are located on inner sides of the hinge points of the limiting rods and the second hinge shaft.

9. The automatic guided vehicle according to claim 8, wherein in the left-right direction, the hinge points of the tie rods and the first hinge shafts are located between hinge points of the first connecting rods and the first hinge shafts and hinge points of the second connecting rods and the first hinge shafts, and the hinge points of the limiting rods and the second hinge shaft are located on outer sides of hinge points of the platform and the second hinge shafts and hinge points of the second connecting rods and the second hinge shafts.

10. The automatic guided vehicle according to claim 7, wherein at least one of the first connecting rod and the second connecting rod comprises a rod body, two first hinge lugs and two second hinge lugs, the two first hinge lugs are connected to a lower end of the rod body, and the two second hinge lugs are connected to an upper end of the rod body, the lower end of at least one of the first connecting rod and the second connecting rod is hinged by the two first hinge lugs, the upper end of at least one of the first connecting rod and the second connecting rod is hinged by the two second hinge lugs, and in the left-right direction, the two second hinge lugs are located on inner sides of the two first hinge lugs.

11. The automatic guided vehicle according to claim 7, wherein the lifting drive mechanism is hinged to the second hinge shaft.

12. The automatic guided vehicle according to claim 11, wherein the drive wheel is arranged on the front chassis, and the front chassis and the rear chassis are hinged at a position offset forward relative to a rotation center of the drive wheel.

13. The automatic guided vehicle according to claim 1, wherein the chassis comprises a front chassis and a rear chassis, the front chassis and the rear chassis are successively arranged in a front-to-rear direction and hinged with each other, the traveling mechanism comprises two drive wheel mechanisms, the two drive wheel mechanisms are arranged opposite to each other on left and right sides of the chassis, and each of the two drive wheel mechanisms comprises a drive wheel.

14. The automatic guided vehicle according to claim 13, wherein the traveling mechanism comprises as at least one of the following:

a first auxiliary wheel mechanism, arranged on the front chassis and comprising a wheel bracket and two first universal wheels, wherein the wheel bracket is hinged with the chassis, and the two first universal wheels are hinged to left and right ends of the wheel bracket; and a second auxiliary wheel mechanism, comprising two second universal wheels arranged on the rear chassis.

\*   \*   \*   \*   \*